(12) United States Patent
Haverkamp et al.

(10) Patent No.: US 8,843,785 B2
(45) Date of Patent: Sep. 23, 2014

(54) COLLECTING DEBUG DATA IN A SECURE CHIP IMPLEMENTATION

(75) Inventors: Frank Haverkamp, Tuebingen (DE); Heiko Michel, Stuttgart (DE); Joerg-Stephan Vogt, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 13/494,314

(22) Filed: Jun. 12, 2012

(65) Prior Publication Data

US 2013/0031420 A1    Jan. 31, 2013

Related U.S. Application Data

(63) Continuation of application No. 13/192,769, filed on Jul. 28, 2011.

(51) Int. Cl.
*G06F 11/00* (2006.01)
*G06F 11/36* (2006.01)
*G06F 21/74* (2013.01)

(52) U.S. Cl.
CPC ............ *G06F 21/74* (2013.01); *G06F 11/3656* (2013.01)
USPC .......................................................... 714/30

(58) Field of Classification Search
USPC .......................................................... 714/30
See application file for complete search history.

(56) References Cited

U.S. PATENT DOCUMENTS 6,829,729 B2 *  12/2004  Hicks et al. ...................... 714/30
7,444,546 B2 *  10/2008  Kimelman et al. .............. 714/31

(Continued)

OTHER PUBLICATIONS

U.S. Appl. No. 13/192,769.

(Continued)

*Primary Examiner* — Joshua Lohn
(74) *Attorney, Agent, or Firm* — Stephen J. Walder, Jr.; Thomas E. Tyson (57) ABSTRACT

Mechanisms, in a processor chip, are provided for obtaining debug data from on-chip logic of the processor chip while the processor chip is in a secure mode of operation. The processor chip is placed into a secure mode of operation in which access to internal logic of the processor chip to control the internal logic of the processor chip, by mechanisms external to the processor chip, is disabled on a debug interface of the processor chip. A triggering condition of the processor chip is detected that is a trigger for initiated debug data collection from the on-chip logic. Debug data collection is performed from the on-chip logic to generate debug data. Data is output, by the processor chip to an external mechanism, on the debug interface based on the debug data.

21 Claims, 4 Drawing Sheets

(56) References Cited

U.S. PATENT DOCUMENTS

| | | | |
|---|---|---|---|
| 7,523,352 B2 | 4/2009 | Bradbury et al. | |
| 7,636,870 B2 | 12/2009 | Ueno | |
| 7,669,084 B2 * | 2/2010 | Duron et al. | 714/30 |
| 7,770,073 B2 | 8/2010 | Fashchik et al. | |
| 7,818,627 B2 | 10/2010 | Thangaraj et al. | |
| 7,822,995 B2 * | 10/2010 | Hars et al. | 713/193 |
| 7,895,426 B2 | 2/2011 | Holm et al. | |
| 7,913,120 B2 * | 3/2011 | Williams et al. | 714/30 |
| 2004/0163013 A1 * | 8/2004 | Watt et al. | 714/30 |
| 2004/0199824 A1 * | 10/2004 | Harter | 714/30 |
| 2004/0250164 A1 * | 12/2004 | Ahmad et al. | 714/30 |
| 2006/0200682 A1 * | 9/2006 | Hars et al. | 713/193 |
| 2007/0101198 A1 * | 5/2007 | Ueno | 714/38 |
| 2008/0071955 A1 * | 3/2008 | Johns et al. | 710/113 |
| 2009/0031171 A1 * | 1/2009 | Fashchik et al. | 714/38 |
| 2009/0055637 A1 * | 2/2009 | Holm et al. | 713/1 |
| 2011/0041017 A1 * | 2/2011 | Zhong et al. | 714/724 |

OTHER PUBLICATIONS

"Debug Port Design Guide for UP/DP Systems", Intel Corporation, http://www.intel.com/design/pentium4/guides/313373.htm, Jun. 2006, 42 pgs.

"Dump Switch Support for Windows", Microsoft, http://www.microsoft.com/whdc/archive/dmpsw.mspx, Dec. 4, 2011, 3 pages.

"Non-maskable interrupt", http://en.wikipedia.org/wiki/Non-maskable_interrupt, downloaded May 31, 2011, 3 pages.

Peterson, K. et al., "Assertion-Based On-Line Verification and Debug Environment for Complex Hardware Systems", Proceedings of the 2004 International Symposium on Circuits and Systems (ISACS '04), 2004, pp. 685-688.

* cited by examiner

COLLECTING DEBUG DATA IN A SECURE CHIP IMPLEMENTATION

This application is a continuation of application Ser. No. 13/192,769, filed Jul. 28, 2011, status pending.

BACKGROUND

The present application relates generally to an improved data processing apparatus and method and more specifically to mechanisms for collecting debug data in a secure chip implementation.

Modern processor chips typically include debug interfaces, e.g., Joint Test Action Group (JTAG) debug interface, IBM Field Replaceable Unit (FRU) Service Interface (available from International Business Machines (IBM) Corporation of Armonk, N.Y.), I2C Slave, etc., which are used during manufacturing, testing and operation to extract debug information from the processor chip in order to ensure that the processor chip functions properly. However, once a processor chip is installed in a secure product, i.e. a computing or electronic device, and thus is "in the field", these debug interfaces are typically locked so that the processor chip operates in a secure mode. This is to eliminate a pathway by which intruders may obtain access to the processor and control it in an undesirable manner. As a result, debug information cannot be obtained via these debug interfaces after the processor chip has been put into service due to the secure mode of operation and the disablement of the debug interfaces.

In order to address this issue, some solutions have been offered but all of them suffer from various drawbacks. For example, IBM RiscWatch, available from IBM Corporation, ARM EJTAG, and Extended Debug Probe (XDP) available from Intel Corporation, all use a JTAG (IEEE 1194.1) interface built into the processor to gain access from an external debug probe to processor internal registers for extracting debug information from the processor chip. Security is very difficult to implement and verify for such JTAG interfaces. Access protection, i.e. no access or read-only access, has to be determined at chip design time for every individual register bit. Logic side-effects or missed functionality easily break either security or function of the chip, which results in a new silicon release of the processor chip being required. For example, assume that a particular register needs to be accessed even in secure chip operation, i.e. after the secure chip is fabricated and deployed in a product. Instead of keeping the debug-interface fully closed an exception may be made for the particular register. However, this solution does not allow one to add any other register exceptions later on due to the fact that the exceptions must be implemented "in silicon."

Another solution in the x86 processor chip based systems is the Non-Maskable Interrupt (NMI) debugger. The NMI debugger is a piece of code in the basic input/output system (BIOS) that is started when a fatal error occurs or a physical button on the front of the computing device is pressed. The NMI debugger provides a debugger that accesses all registers in-band, i.e. within the processor chip itself having full control of the processor. The NMI debugger is implemented as part of the operating system, where when pressing a physical button on the computing device, the operating system would jump to a special exception vector where the operating system placed debugging code. With the NMI debugger, there is no hardware access protection and the NMI debugger is dependent on a fully functional main processor, i.e. non-failing, executing code.

SUMMARY

In one illustrative embodiment, a method, in a processor chip, is provided for obtaining debug data from on-chip logic of the processor chip while the processor chip is in a secure mode of operation. The method comprises placing, by the processor chip, the processor chip into a secure mode of operation in which access to internal logic of the processor chip to control the internal logic of the processor chip, by mechanisms external to the processor chip, is disabled on an interface of the processor chip. The method further comprises detecting, by the processor chip, a triggering condition of the processor chip that is a trigger for initiated debug data collection from the on-chip logic. Moreover, the method comprises performing, by the processor chip, debug data collection from the on-chip logic to generate debug data. In addition, the method comprises outputting, by the processor chip to an external mechanism via the interface, data generated based on the debug data.

In other illustrative embodiments, a processor chip is provided that comprises various logic elements for implementing the various operations of the method described above. For example, the processor chip may comprise interface logic that provides a communication pathway between internal logic of the processor chip and an external mechanism. Moreover, the processor chip may comprise hardware logic that places the processor chip into a secure mode of operation in which access to internal logic of the processor chip to control the internal logic of the processor chip, by the external mechanism to the processor chip, is disabled on an interface of the processor chip. Furthermore, the processor chip may comprise health monitoring logic that detects a triggering condition of the processor chip that is a trigger for initiated debug data collection from on-chip logic while the processor chip is in the secure mode of operation. In addition, the processor chip may comprise debug data collection engine that collects debug data from the on-chip logic to generate debug data while the processor chip is in the secure mode of operation, wherein the debug data collection engine generates data based on the debug data and the data is output to an external mechanism via the interface while the processor chip is in the secure mode of operation.

In still other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise a processor chip comprising one or more processor cores. The processor cores may be coupled to a memory. The processor chip may comprise logic for implementing the various operations outlined above with regard to the method. For example, the processor chip may implement the logic described above with regard to the processor chip illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for allowing debug information to be collected from a chip after debug interfaces of the chip have been disabled and the chip is placed "in the field," i.e. when the processor chip is operating in a secure mode that does not permit external control access to the internal mechanisms of the processor chip. The illustrative embodiments make use of a power-on-reset (POR) engine built into the chip that is typically used at chip initialization to perform special operations for initializing the chip, such as configuring scan-rings and setup of processor registers. Following this chip initialization, the POR engine is typically stopped and not used again until a next power-on event requiring chip initialization, i.e. after power has been lost to the chip and resumed, e.g., due to a reset operation or the like.

With the mechanisms of the illustrative embodiments, rather than stopping the POR engine after chip initialization, the POR engine continues to operate and is used to monitor the health of the processor chip by monitoring error status on the chip, e.g., monitoring the status of a checkstop bit, which is used to indicate a stop of the processor, i.e. freeze the logic state of the processor, so as to avoid operating on corrupted data. That is, individual processor units (processing cores, memory controller, accelerators, PCIe-cores, elastic interface/multichip-links, internal-processor busses, and the like) have their own checking mechanisms, e.g., error correction code (ECC) or parity error mechanisms. When a unit discovers unrecoverable errors, it will trigger this checkstop bit by writing a value to this checkstop bit. Furthermore, the checkstop bit will also inform any other unit on the chip about this unrecoverable error which will cause the whole chip to freeze. This prevents data corruption and initiates gathering debug data and initiation of recovery operations, e.g., reboot, dynamic replacement of the failed processing unit, or the like.

If an error is detected to have occurred, the processor cores on the processor chip are configured to stop operation immediately, i.e. perform a checkstop operation. If the POR engine detects such a condition, the POR engine executes debug data collection engine logic which collects data from the various parts of the processor chip and stores this debug data in a debug data buffer or other storage mechanism that is accessible in a read-only manner via one or more interfaces of the processor chip. Alternatively, the collected debug data may be pushed to the one or more interfaces without requiring storage in an on-chip debug data buffer.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon. The computer program product may be used to distribute the computer usable program code that is used to implement the mechanisms of the illustrative embodiments within a processor chip's hardware mechanisms, for example.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), or any suitable combination of the foregoing. In the context of this document, a computer readable storage medium may be any tangible medium that can contain or store a program for use by or in connection with an instruction execution system, apparatus, or device. The media on which the debug data collection mechanisms are stored maybe part of a chip security envelope and thus, there are mechanisms provided to protect the debug data collection mechanisms against modification of any kind.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. In some illustrative embodiments, the implementation programming language is a POR-engine assembly or C-code. The program code may be executed entirely in a chip security envelope.

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
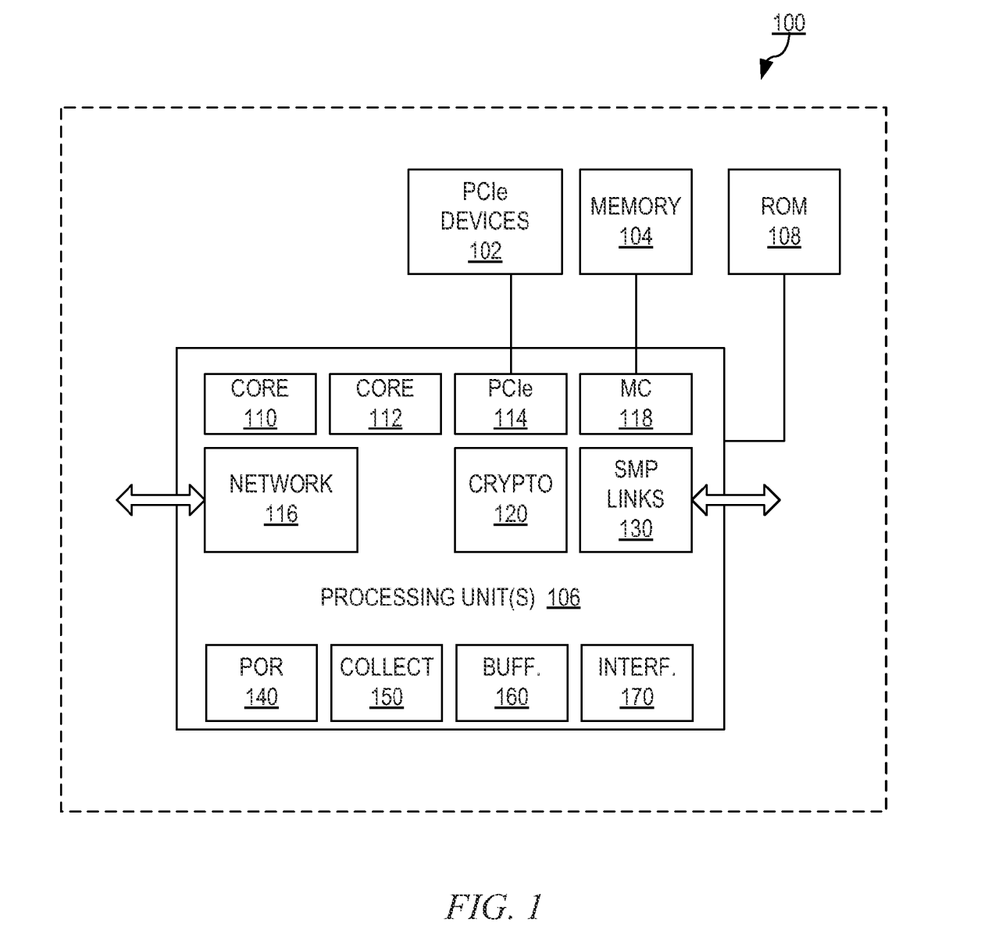
FIG. 1 is an example block diagram of a data processing system in which aspects of the illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

With reference now to FIG. 1, a block diagram of an example data processing system is shown in which aspects of the illustrative embodiments may be implemented. Data processing system 100 is an example of a computing system in which computer usable code or instructions implementing the processes for illustrative embodiments of the present invention may be located or in which hardware logic or a combination of hardware logic and computer usable code/instructions may be provided for implementing the various aspects of the illustrative embodiments described hereafter, or equivalents thereof.

In the depicted example, data processing system 100 may be any known or later developed data processing system in which the mechanisms of the illustrative embodiments are implemented in one or more hardware devices of the data processing system. These hardware devices may perform various functions including operating as the central processing unit (CPU) of the data processing system 100, a communications hardware device, a storage controller or other storage hardware device, a cryptographic processor, a network security device, or any other hardware device from which debug information may be retrieved via interfaces that are typically disabled after manufacturing and testing, i.e. after deployment of the hardware device in the data processing system 100.

In the depicted example, the data processing system 100 employs the mechanisms of the illustrative embodiments in one or more processing unit(s) 106 of the data processing system. The one or more processing unit(s) may comprise one or more of a central processing unit (CPU), a service processor, a co-processor, a cryptographic processor, a storage controller, a communications processor, or the like. It should be appreciated that the depicted example is only an example and is not intended to state or imply any limitation as to the types of hardware devices in which the mechanisms of the illustrative embodiments may be implemented. Any hardware device from which debug information may be retrieved, whether that hardware device is in a secure operational state or a non-secure operational state, may be used to implement the mechanisms of the illustrative embodiments without departing from the spirit and scope of the present invention.

As shown in FIG. 1, the processing unit(s) 106 comprise one or more processor cores 110 and 112 (although two are shown in FIG. 1, any number of processor cores is possible), one or more communications interfaces 114 and 116 (which in the depicted example are a PCIe interface 114 and a network interface 116, as examples), a memory controller 118, a cryptographic processor core 120, and symmetric multiprocessor (SMP) links 130. The processor cores 110 and 112 operate to execute instructions and process data to generate outputs, as is generally known in the art. The PCIe interface 114 provides a communications interface through which communication with one or more PCIe devices 102, external to the processing unit(s) 106, is made possible. PCIe devices may include, for example, Ethernet adapters, add-in cards, and PC cards for notebook computers.

The network interface 116 provides a communication interface through which the processing unit(s) 106 may communicate with other devices via one or more data networks. The memory controller 118 coordinates and controls access to memory 104 which is external to the processing unit(s) 106. The cryptographic processor core 120 operates to perform cryptographic functions on data being read or written by the processing unit(s) 106 with regard to the memory 104 as well as communicated over the communication interfaces 114 and 116, for example. The SMP links 130 serve to provide communication links between the processing unit(s) 106 and other processing unit(s) within the same data processing system that may operate in concert as a symmetric multiprocessor (SMP) data processing system 100. The data processing system 100 may further be coupled to a ROM 108 and other devices (not show) to facilitate further functionality in the processing unit(s) 106. The operation of these elements 102-104, 108, and 110-130 is generally known in the art and thus, a more detailed explanation of the functions of each of these elements is not provided herein.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention. Moreover, the processing unit(s) 106 in FIG. 1 need not have any or all of the elements 110-130 in some embodiments, although generally the processing unit(s)

106 will have at least one core and a memory controller or equivalent logic for interfacing with a memory. Furthermore, the data processing system 100 need not have PCIe devices 102, memory 104, and/or ROM 108, although some memory will typically be included.

Moreover, the data processing system 100 may take the form of any of a number of different data processing systems including client computing devices, server computing devices, a tablet computer, laptop computer, telephone or other communication device, a personal digital assistant (PDA), router, printer, or any other data processing device or system in which debug information may need to be retrieved from a hardware device using disabled interfaces. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

In accordance with the mechanisms of the illustrative embodiments, the processing unit(s) 106 of the data processing system 100 may further comprise health monitoring logic 140, such as power-on-reset (POR) logic 140, debug data collection engine logic 150, optional debug data buffer logic 160, and one or more debug interfaces 170. While debug data collection engine logic 150 is shown as separate from the health monitoring logic 140 (or POR logic 140), it should be appreciated that these elements may be combined or even partially combined such that these elements 140 and 150 logically overlap. In one illustrative embodiment, the debug data collection engine logic 150 may be considered an extension of the POR logic 140.

In accordance with the mechanisms of the illustrative embodiments, after manufacturing and testing of the processing unit 106, and in preparation for deployment of the processing unit 106 in the data processing system 100 such that it is "in the field" and operational within the data processing system 100, the processing unit 106 is placed in a secure mode of operation. In this secure mode of operation, the debug interface(s) 170 of the processing unit 106 are disabled such that general access by external mechanisms to the internal logic of the processing unit 106 is disabled and external control of the internal logic of the processing unit 106 is not possible. In one illustrative embodiment, while this general access is disabled, access may be provided to a debug data buffer 160 only, via these interfaces 170, such that debug data may be output to external debug systems and storage mechanisms. In general, only read only access to the debug data buffer 160 is made possible through the debug interfaces 170.

The POR logic 140, which as discussed above is generally only used by prior art mechanisms to perform processor chip initialization and then is shut down and not used while the processor chip is in an operational mode, is instead maintained operational even after processor chip initialization. The POR logic 140 monitors the health of the processing unit 106 to detect an error condition of the processor chip which results in the processor core(s) of the processor chip to stop operation immediately, i.e. a checkstop condition. In such a case, the POR logic 140 instructs debug data collection logic 150 to collect debug data from the logic on the processor chip, including the processor cores, and store that debug data in a debug data buffer 160 or otherwise directly output the debug data to the debug interface(s) 170 of the processor chip.

In this way, debug data is able to be obtained from the logic on the processor chip via the debug interfaces 170 even after deployment of the processor chip "in the field" and after the processor chip has been placed into a secure mode of operation disabling general access to the internal logic of the processor chip via the debug interface(s). This debug data may be used in many different ways once it is obtained from the processor chip. For example, the debug data may be used to identify and isolate field replaceable units (FRUs) for potential replacement. As another example, this debug data may be used for analyzing the problem encountered by the processor chip so that later improvement of hardware and/or software of the processor chip may be made.

Figure 2:
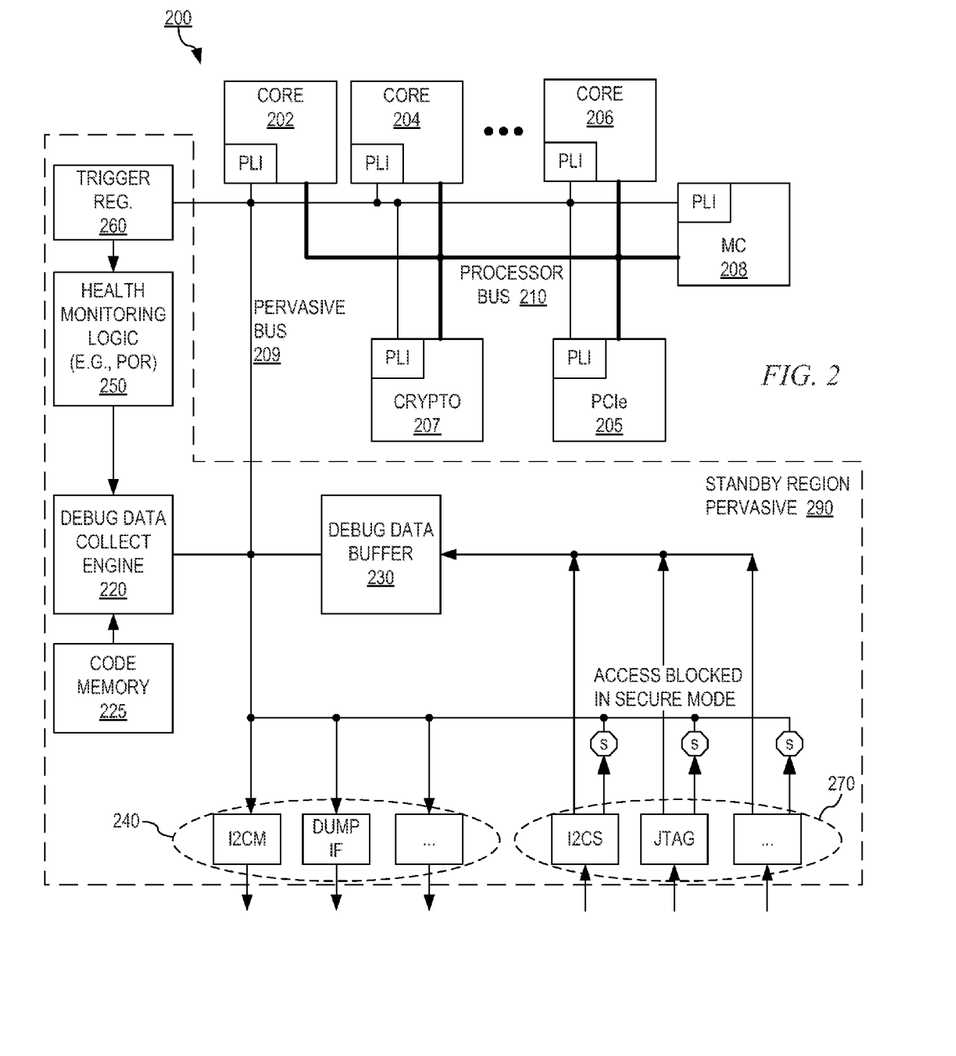
FIG. 2 is an example block diagram illustrating the primary operational elements of an on-chip debug data collection mechanism in accordance with one illustrative embodiment where collected debug data is pulled from the debug data buffer by external devices.

FIG. 2 is an example block diagram illustrating the primary operational elements of an on-chip debug data collection mechanism in accordance with one illustrative embodiment. As shown in FIG. 2, a processor chip 200 may be provided that comprises a plurality of processor cores 202-206, a memory controller 208, a crypto controller 207 and a PCIe interface 205 coupled to one another via a processor bus 210. A pervasive bus 209 couples the processor cores 202-206, memory controller 208, crypto controller 207 and PCIe interface 205 with debug data collection engine logic 220 and debug data buffer 230. Other logic on the processor chip 200, not explicitly shown in FIG. 2, may likewise be coupled to the debug collection engine logic 220 and debug data buffer 230 via the pervasive bus 209 or other data connection(s).

The term "pervasive" refers to the use of a pervasive chiplet which is a special unit that is tasked with configuring and enabling units of a processor chip (referred to as "chiplets"), e.g., processing units, memory controllers, PCIe-cores, accelerator units, etc., when the processor chip operation is started. The pervasive chiplet may connect to any other unit on the processor chip 200 and is automatically clocked such that it can initialize any other unit or gather debug data using the mechanisms of the illustrative embodiments. The connections to the other units of the processor chip 200 are implemented by the pervasive bus 209. It should be noted that even in a severe error situation, such as a checkstop condition or the like, the pervasive logic, i.e. the standby region logic connected to the pervasive bus 209, is still alive and operational. This includes the mechanisms of the illustrative embodiments, including the debug data collection engine logic 220, debug data buffer 230, and the like within the standby region pervasive 290.

The debug data collection engine logic 220 controls the collection of debug data from the various logic elements of the processor chip 200, e.g., processor cores 202-206, memory controller 208, crypto controller 207 and PCIe interface 205, as well as the output of this debug data to the interfaces 240 of the processor chip 200, which may be dedicated debug interfaces or standard interfaces used during normal processor runtime but shared with debug logic. The debug data collection engine logic 220 may operate according to a debug code stored in code memory 225. This debug code 225 may further provide instructions for governing an analysis performed by the debug data collection engine logic 220 on the collected debug data to determine what debug data should be output on the output interfaces 240.

The debug data collection engine logic 220 may operate in response to a command from on-chip health monitoring logic 250 that monitors the health of the chip 200 for the occurrence of an error condition that causes one or more of the processor cores 202-206 and/or the memory controller 208, crypto controller 207, PCIe interface 205, or other critical logic of the processor chip 200, to fail or stop operating properly. In one illustrative embodiment, this on-chip health monitoring logic 250 is a power-on-reset (POR) engine built into the processor chip 200 and whose primary purpose is to assist with chip 200 initialization in response to the occurrence of a powering up of the processor chip, such as in the event of a turning on of the data processing system in which the processor chip 200 is present, in response to a reset operation, or the like. Contrary to known mechanisms, instead of stopping the operation of the POR engine after initialization of the processor chip 200, the illustrative embodiments may maintain the operation of the POR engine but in a health monitoring mode.

The on-chip health monitoring logic 250, e.g., POR engine, is essentially a minimalistic micro-processor which supports special operations for chip initialization, e.g., configuring of scan rings and setup of processor registers, and further supports special operations for health monitoring in accordance with the illustrative embodiments. The on-chip health monitoring logic 250, or POR engine, may monitor the condition of one or more trigger register values in one or more trigger registers 260 that are indicative of one or more health states of the processor chip. In one illustrative embodiment, the one or more trigger value registers 260 comprises a checkstop value register that is written to in response to one or more of the critical logic elements of the processor chip 200, e.g., processor cores 202-206, memory controller 208, crypto controller 207 or PCIe interface 205, encountering an error or failure that causes a logic element to stop operating or stop operating correctly. The on-chip health monitoring logic 250 may continuously or periodically poll the state of these one or more trigger value registers 260 to determine if an error state exists. Alternatively, wake-and-go logic may be associated with the one or more trigger value registers 260 such that when the value of a trigger value register 260 is written, the health monitoring logic 250, or POR engine, may be awaken so as to investigate the state of the value written to the one or more trigger value registers.

When the processor chip 200 is manufactured and passes manufacturer testing, the processor chip 200 is placed into a secure mode of operation. The processor chip is then put into operation "in the field," e.g., is installed into a data processing system, such as part of the processing unit 106 in data processing system 100 of FIG. 1, for example, and is made operational, still operating in a secure mode of operation. As part of this secure mode of operation, the inbound debug interfaces 270 are locked and are not able to be used by external mechanisms to obtain control of the internal logic of the processor chip 200 (this is represented by the octagons with the "S" intended to represent a "stop" sign). To the contrary, with the mechanisms of the illustrative embodiments, when in a secure mode of operation, the inbound debug interfaces 270 can only be used for read-only access of the debug data buffer 230.

When the processor chip 200 is powered on, or in response to a reset operation, the on-chip health monitoring logic 250 may perform power-on-reset (POR) operations to assist in initializing the processor chip 200 to an initial operational state by, for example, configuring scan-rings, processor registers, and the like. After performing this POR initialization operation, the on-chip health monitoring logic 250 begins monitoring the health of the logic of the processor chip 200. In one illustrative embodiment, the on-chip health monitoring logic 250 monitors the state of the logic of the processor chip 200 by monitoring the state of values in triggering value registers 260. In response to a value in one or more of these triggering value registers 260 indicating an error condition having occurred in logic of the processor chip 200, e.g., in one of the processor cores 202-206, memory controller 208, crypto controller 207, PCIe interface 205, or the like.

In response to detecting the error condition, the on-chip health monitoring logic 250 may send a command to the debug data collection engine logic 220 to initiate collection of debug data from the various logic elements of the processor chip 200, e.g., from the pervasive logic interfaces (PLIs) of the processor cores 202-206, memory controller 208, crypto controller 207, PCIe interface 205, and the like, via the pervasive bus 209. The data that is collected may comprise, for example, any logic state information, e.g., register bit state, memory cell state, etc. inside the chip that may assist in debugging operations. For example, it may be helpful to know the current address of a transfer when an interface fails. While the address bits are not part of an error register, the address bit would assist with debug operations and can be gathered from other registers. The actual collection of the data may be performed in various ways depending on the type of data and where it is being collected from. For example, data may be collected from fault isolation registers (FIRs) and/or by dumping configuration and status register information to a storage location. Further data collection may be done with regard to scan rings which contain a large number of bits from various places within the processor chip and which may essentially contain all current logic states of the whole chip. Moreover, data may be obtained from memory dumps or the like, e.g., dumping the contents of the cache memory or the like. The data that is collected, or at least a portion of the data collected, may be stored in the debug data buffer 230.

In one illustrative embodiment, the debug data collection engine logic 220 may determine what data to extract from the various logic elements of the processor chip 200 based on code stored in the code memory 225. Moreover, the code in the code memory 225 may specify analysis to be performed by the debug data collection engine logic 220 in order to determine what debug data to store in the debug data buffer 230 and/or output on the output debug interfaces 240. This code may further provide instructions executable by the debug data collection engine logic 220 to analyze the debug data to perform on-chip internal debugging of the error condition of the processor chip 200. That is, the code in the code memory 225 may be executed by the debug data collection engine 220 to determine a source of the error condition and possible solutions to the error condition so that the operation of the processor chip 200 may be altered and/or rebooted to avoid the error condition.

The code in the code memory 225 is preferably modifiable during and up to a final stage of the manufacturing and testing stage of the processor chip 200 fabrication. However, once manufacturing and testing is finalized, the code in the code memory 225 is made read-only and is kept secure in the code memory 225. In one illustrative embodiment, the code may be encrypted in the code memory 225 using cryptographic mechanisms, such as signatures, keys, or the like. In some illustrative embodiments, the code memory may be a programmable read-only memory (PROM) or the like.

The results of the analysis performed by the code in the code memory 225 as executed by the debug data collection engine logic 220 may be stored in the debug data buffer 230 and/or output to the output interfaces 240 for use by external equipment (not shown). In one illustrative embodiment, the analysis is done by the debug data collection engine 220 prior to storage of data into the debug data buffer 230, i.e. the data that is stored into the debug data buffer 230 is only the analyzed debug data which may be a subset or a modification of the raw debug data received from the on-chip logic elements, e.g., processor cores 202-206, memory controller 208, crypto controller 207 and PCIe interface 205. In such a case, the debug data buffer 230 may be made smaller in size and the amount of data output on the output debug interfaces 240 may be minimized by outputting the results of the analysis rather than the raw debug data, e.g., the analysis may serve to filter out unwanted debug data or otherwise transform a large set of debug data into a smaller set of debug data. In other illustrative embodiments, the debug data buffer 230 may store the raw debug data and this raw debug data may be likewise output on the output interfaces 240.

In yet another illustrative embodiment, the debug data buffer 230 may store the raw debug data and this raw debug data may be analyzed by the code in the code memory 225 as executed by the debug data collection engine 220 in response to an operation for outputting the debug data from the debug data buffer 230 to the output interfaces 240. In this way, the debug data buffer 230 may store all of the raw debug data but select portions or transformations of the raw debug data may be output on the output interfaces 240 in accordance with the analysis performed by the debug data collection engine 220.

The output of the debug data, either raw debug data or analyzed debug data that has been either filtered or transformed by the analysis performed by the debug data collection engine 220, may be output on the output interfaces 240 either automatically or in response to a read command received via one or more of the input debug interfaces 270. In general, the input debug interfaces 270 have general access to the internal logic of the processor chip 200 disabled or blocked due to the secure mode of operation in which the processor chip 200 is operating. Moreover, in this secure mode of operation, the input debug interfaces 270 only allow read commands to be input on the input debug interfaces 270 to the debug data buffer 230 and access to other on-chip logic is disabled. Thus, a read command may be received by the debug data buffer 230 via the input debug interfaces 270 but all other logic on the chip 200 is not accessible via the input debug interfaces 270 when in secure operating mode and furthermore, writing to the debug data buffer 230 is not made possible via these input debug interfaces 270.

In response to a read command received via one or more of the input debug interfaces 270, the debug data stored in the debug data buffer 230 may be read out and output via the output interfaces 240. In some illustrative embodiments, the debug data that is read out of the debug data buffer 230 may be the raw debug data collected by the debug data collection engine logic 220 while in others, it may be the filtered/transformed debug data generated as a result of analysis performed by the debug data collection engine logic 220 using the code in code memory 225. Still further, as mentioned above, the data output may be the raw debug data from the debug data buffer 230 which is filtered/transformed by the analysis performed by the debug data collection engine logic 220 prior to the resulting output debug data being output on the output debug interfaces 240.

While the above description assumes that the output of the debug data is initiated in response to an external mechanism (external meaning external to the processor chip 200), such as external debugger hardware/software, an external service processor, or the like, submitting a read command via the input debug interfaces 270, the illustrative embodiments are not limited to such. Rather, the output of the debug data may be initiated in response to internal commands provided by and within the logic of the processor chip itself For example, the debug data collection engine logic 220 may operate as a secure "post mortem" debugger that may itself debug the processor chip 200 and initiate appropriate operations to resolve the error condition, e.g., disable a particular processor core, provide an output indicative of the source of the error, or the like.

The processor cores 202-206 can be programmed to read the debug data buffer 230 after a restart if they are operable again. They operate as a secure post mortem debugger where a working processor debugs the previous failure that had lead to a checkstop. The processor can then decide to use the debug data only internally, to send it through any functional interface, such as PCIe or network directly, or to preprocess it and send the preprocessed data. Thus the debug data buffer 230 allows for analyzing and processing of debug data by a functional processor core 202-206 within the system after its recovery.

Furthermore, the illustrative embodiment shown in FIG. 2 is one example of an implementation of the present invention in which a polling methodology is utilized. That is, the debug data is not output by the debug data buffer until requested by receipt of a read command from either an internal or an external mechanism. However, the illustrative embodiments are not limited to polling methodologies. To the contrary, in other illustrative embodiments, a pushing methodology, or a combination of a pushing and polling methodology, may be implemented without departing from the spirit and scope of the illustrative embodiments.

Figure 3:
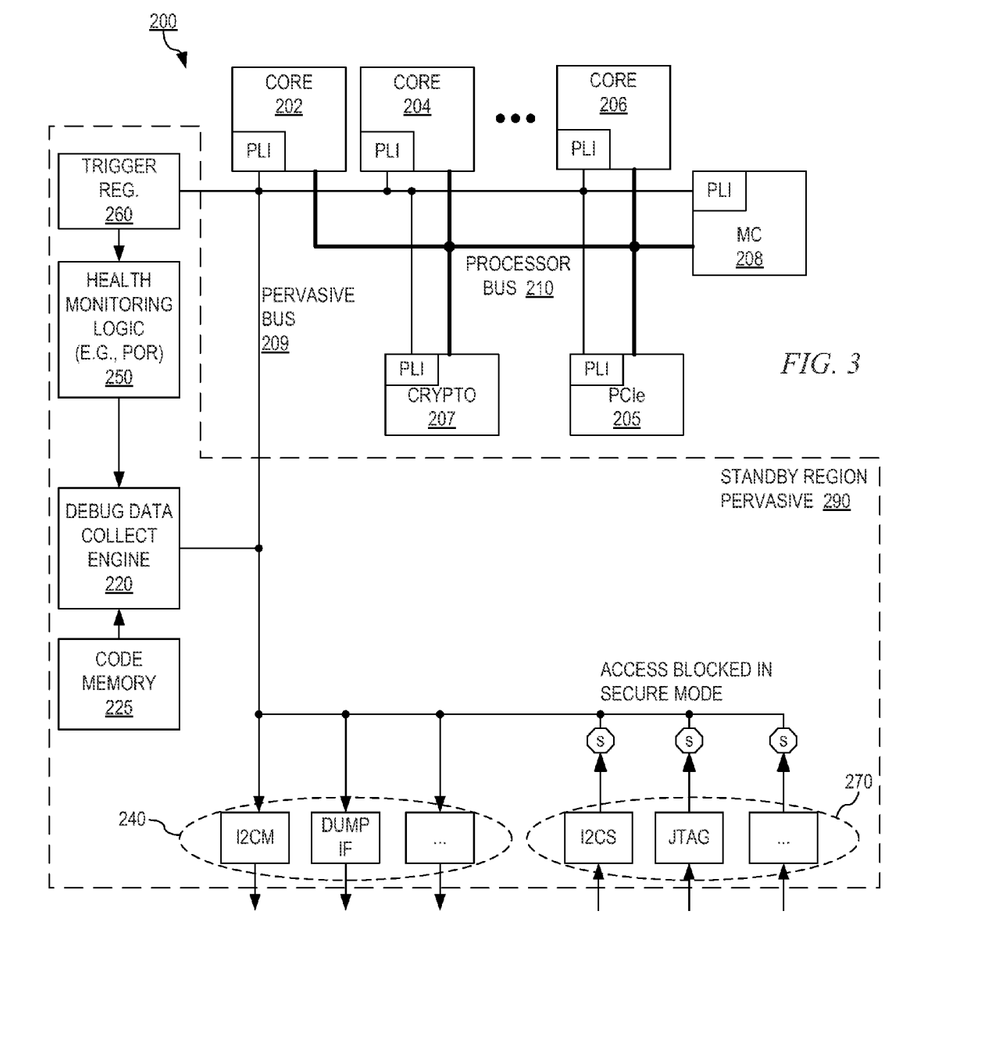
FIG. 3 is an example block diagram illustrating the primary operational elements of an on-chip debug data collection mechanism in accordance with another illustrative embodiment where collected debug data is pushed by the debug data collection engine to external devices.

FIG. 3 is an example block diagram illustrating the primary operational elements of an on-chip debug data collection mechanism in accordance with another illustrative embodiment. As shown in FIG. 3, this illustrative embodiment is similar to the illustrative embodiment depicted in FIG. 2 but with the debug data buffer having been removed. In the pushing methodology, the debug data, either raw or filtered/transformed debug data, is pushed to the output interfaces 240 directly by the debug data collection engine 220 without having to be stored in a debug data buffer to await a read command from an internal/external mechanism. Thus, in the event of an error condition being detected by the on-chip health monitoring logic 250, the on-chip health monitoring logic 250 commands the debug data collection engine logic 220 to extract and collect debug data from the various on-chip logic elements, e.g., processor cores 202-206, memory controller 208, crypto controller 207, PCIe interface 205 and the like. The debug data collection engine logic 220 extracts the data, optionally performs analysis on the extracted debug data according to code stored in code memory 225 and executed by the debug data collection engine logic 220, and then outputs either the raw debug data (if no analysis is done), or the filtered/transformed debug data generated as a result of the analysis, directly to the output interfaces 240 without having to store this data in a debug data buffer and without having to require a read command from the input debug interfaces 270. Thus, essentially, the debug data collection engine logic 220 pushes the debug data to the output interface 240 in response to the detected error condition.

It should be appreciated that while FIGS. 2 and 3 illustrate various logic elements of the processor chip 200, these elements are not limited to being implemented entirely in hardware. To the contrary, some aspects of the elements may be implemented as software or firmware in the processor chip 200. For example, the code memory 225 may store, either as software instructions or firmware, the code to be executed by the debug data collection engine logic 220, which itself may be a processor executing debug data collection code, a special purpose hardware or circuit element, or the like.

Once the debug data is output on the output interfaces 240, the data can be used by various external hardware and software mechanisms to achieve various purposes. For example, the external mechanisms may comprise debugging hardware/software that takes the output debug data and determines a source of errors in the chip 200, potential solutions to the errors, potential improvements to the chip 200 operation and/or design, or the like. In one illustrative embodiment, the external mechanisms may identify field replaceable units (FRUs) of the chip that may be replaced to solve the problem leading to the error. Moreover, the external mechanism may comprise a simple debug logging mechanism that logs the debug data for later use by another system to perform various operations.

Thus, the illustrative embodiments provide mechanisms for allowing access to on-chip debug data via debug interfaces of the chip while the chip is operating in a secure mode of operation, i.e. external access via input debug interfaces to internal chip logic for controlling the operation of the chip is generally blocked or disabled. The mechanisms of the illustrative embodiments thus, allow debug data to be collected and output by the chip via output debug interfaces even after the chip has been placed in the secure mode of operation, i.e. the chip is "in the field," with minimal additional on-chip logic required.

Figure 4:
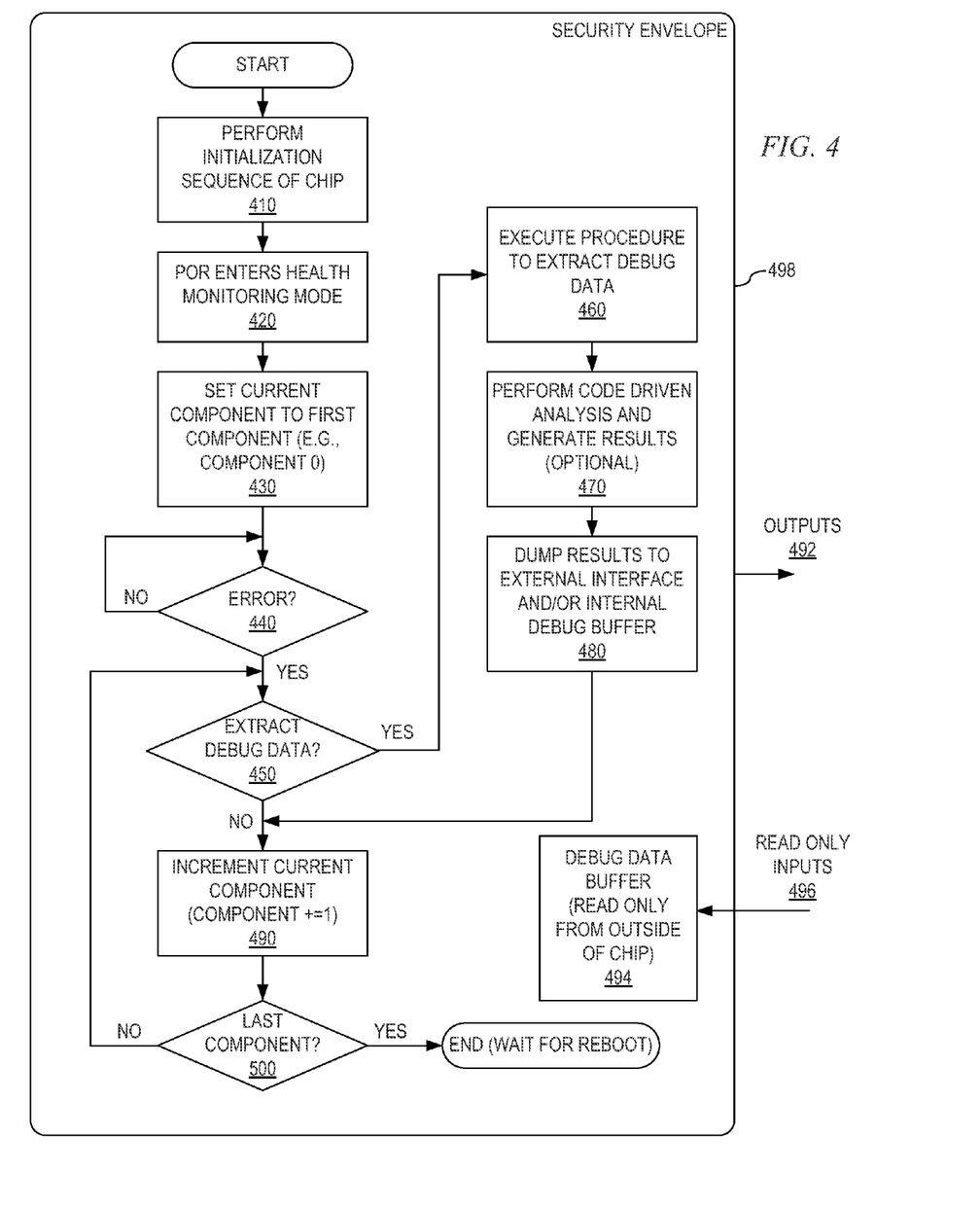
FIG. 4 is an example diagram illustrating a process for outputting debug information in a secure chip environment in accordance with one illustrative embodiment.

FIG. 4 is an example diagram illustrating a process for outputting debug information in a secure chip environment in accordance with one illustrative embodiment. The operation outlined in FIG. 4 may be implemented, for example, on a processor chip using logic that is used to initialize the processor chip to an initial operational state, e.g., POR logic in the depicted example, to perform processor chip health monitoring operations and debug data output. Additional logic may also be provided, e.g., the debug data collection engine logic and debug data buffer, to help facilitate the collection of debug data and output of this debug data through existing output debug interfaces.

As shown in FIG. 4, the operation starts with the POR engine logic performing an initialization sequence to initialize the chip to an operational state (step 410). This initialization may comprise setting up scan chains, processor registers, and the like, to an initial state at which point the POR engine logic would typically go to sleep or stop operating and control is passed over to the processor chip to operate in an operational mode. However, with the mechanisms of the illustrative embodiments, rather than having the POR engine logic go into a stopped or sleep state, the POR engine logic enters a health monitoring mode of operation (step 420) in which the POR engine monitors the health of the chip for any error conditions.

In the health monitoring mode of operation, the POR engine initialize the component from which to extract debug information to a first component, e.g., component 0 (step 430) and then determines if an error condition, e.g., a chip crash/malfunction, has occurred (step 440). Such a determination may be made based on checking one or more status registers of the processor chip which are set in response to logic of the chip encountering various error conditions. For example, the POR engine logic may check a checkstop register to see if a value in this register has been set to a predetermined value indicative of a checkstop condition occurring in one or more of the processor cores or memory controller of the processor chip. If such a condition has occurred, the value in the checkstop register may be set to the predetermined value and the POR engine logic detects this setting as indicative of an error condition, e.g., a crash or malfunction of the chip.

If an error condition is detected (step 440), the POR engine logic determines whether to extract debug data from the current component, e.g., component 0 initially (step 450). If so, then a procedure to extract the relevant debug data is executed (step 460). Optionally, code driven analysis of the extracted debug data is performed and results of the analysis may be generated (step 470). The results of the analysis may then be dumped to the output debug interface or to an internal debug data buffer 494, or both depending upon the particular implementation (step 480), i.e. outputs 492. Thereafter, or if debug data is not to be extracted from the current component, the current component is incremented (step 490). A determination is made as to whether the current component is equal to n, i.e. all of the components have been checked to determine if debug data should be extracted (step 500). If so, then the operation terminates. Otherwise, the operation returns to step 450 and repeats the operation for the next component.

It should be noted that either the raw extracted debug data or the results of the analysis, or both, may be stored in an on-chip debug data buffer 494 which is read-only from outside the processor chip. Read only inputs 496 may be received from external to the chip and provided to the debug data buffer 494. It should further be noted that all of these operations are performed within a secure envelope 498, e.g., hardware operating in a secure mode of operation, indicating that there is no possibility of manipulation of the chip's internal state. This is accomplished by only using a read-only interface 496 and/or providing the debug data via output only debug data interfaces 492 used by the debug data collection engine logic to push the debug data, or the results of the analysis, out of the chip to external mechanisms.

It should be noted that while the illustrative embodiments are described in terms of a secure processor chip environment implementing a secure envelope, the mechanisms of the illustrative embodiments are not limited to such. To the contrary, the mechanisms of the illustrative embodiments may further be implemented with regard to non-secure processor chips. While security is considerably less in such an implementation, the filtering and analysis of debug data that may be performed by the debug data collection engine 220 and the like, may be useful even in the case of non-secure processor chips.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a processor chip, for obtaining debug data from on-chip logic of the processor chip while the processor chip is in a secure mode of operation, comprising:
   placing the processor chip into a secure mode of operation in which access to internal logic of the processor chip to control the internal logic of the processor chip, by mechanisms external to the processor chip, is disabled on an interface of the processor chip;
   detecting, by health monitoring logic of the processor chip, a triggering condition of the processor chip that is a trigger for initiating debug data collection from the on-chip logic;
   performing, by an on-chip programmable debug data collection engine of the processor chip, debug data collection from the on-chip logic to generate debug data; and
   outputting, by the on-chip programmable debug data collection engine of the processor chip, to an external mechanism via the interface, data generated by the on-chip programmable debug data collection engine based on the debug data.

2. The method of claim 1, wherein the debug data is collected from on-chip hardware devices via a pervasive bus.

3. The method of claim 1, wherein the health monitoring logic monitors the processor chip to detect an error condition of the processor chip which results in one or more processor cores or critical logic of the processor chip to fail, and wherein the health monitoring logic of the processor chip initiates debug data collection by the debug data collection engine of the processor chip from on-chip logic in response to detecting the error condition.

4. The method of claim 3, wherein the health monitoring logic is a power-on reset logic unit of the processor chip that operates in a health monitoring mode of operation after power-on of the processor chip.

5. The method of claim 1, wherein the data generated based on the debug data is a transformation of the debug data into data representative of a failure within logic of the processor chip based on analysis performed by an on-chip debug data collection engine.

6. The method of claim 5, wherein the analysis performed by the on-chip debug data collection engine comprises analysis on the debug data to identify a source of the failure within the logic of the processor chip, and wherein the data generated based on the debug data identifies the source of the failure.

7. The method of claim 5, wherein the transformation of the debug data into data representative of the failure within logic of the processor chip filtering out unwanted debug data, or transforming the debug data into a smaller set of data representative of the failure, prior to writing the data to an on-chip debug data buffer.

8. The method of claim 1, wherein outputting data generated based on the debug data comprises:
   storing the debug data in an on-chip debug data buffer; and
   reading, by the external mechanism, data from the debug data buffer via the interface, wherein the interface provides external access by the external mechanism to only the debug data buffer on the processor chip and does not permit the external mechanism to access other internal logic of the processor chip.

9. The method of claim 1, wherein detecting a triggering condition of the processor chip that is a trigger for initiated debug data collection from the on-chip logic comprises polling a value of a trigger register to determine if the trigger register has a value written to the trigger register indicative of a failure in one of a processor core or critical logic of the processor chip.

10. The method of claim 1, wherein the method is implemented within a security envelope of the processor chip in which only read-only access to select internal logic of the processor chip by external mechanisms is permitted.

11. A processor chip, comprising:
    interface logic that provides a communication pathway between internal logic of the processor chip and an external mechanism;
    hardware logic that places the processor chip into a secure mode of operation in which access to internal logic of the processor chip to control the internal logic of the processor chip, by the external mechanism to the processor chip, is disabled on an interface of the processor chip;
    health monitoring logic that detects a triggering condition of the processor chip that is a trigger for initiating debug data collection from on-chip logic while the processor chip is in the secure mode of operation; and
    debug data collection engine that collects debug data from the on-chip logic to generate debug data while the processor chip is in the secure mode of operation, wherein the debug data collection engine generates data based on the debug data and the data is output to an external mechanism via the interface while the processor chip is in the secure mode of operation.

12. The processor chip of claim 11, wherein the debug data is collected from on-chip hardware devices via a pervasive bus of the processor chip.

13. The processor chip of claim 11, wherein the health monitoring logic monitors the processor chip to detect an error condition of the processor chip which results in one or more processor cores or critical logic of the processor chip to fail, and wherein the health monitoring logic of the processor chip initiates debug data collection by the debug data collection engine of the processor chip from on-chip logic in response to detecting the error condition.

14. The processor chip of claim 11, wherein the health monitoring logic is a power-on reset logic unit of the processor chip that operates in a health monitoring mode of operation after power-on of the processor chip.

15. The processor chip of claim 11, wherein the data generated based on the debug data is a transformation of the debug data into data representative of a failure within logic of the processor chip based on analysis performed by the debug data collection engine.

16. The processor chip of claim 15, wherein the analysis performed by the debug data collection engine comprises analysis on the debug data to identify a source of the failure within the logic of the processor chip, and wherein the data generated based on the debug data identifies the source of the failure.

17. The processor chip of claim 15, wherein the transformation of the debug data into data representative of the failure within logic of the processor chip filtering out unwanted debug data, or transforming the debug data into a smaller set of data representative of the failure, prior to writing the data to an on-chip debug data buffer or an output interface.

18. The processor chip of claim 11, further comprising a debug data buffer, wherein the debug data collection engine outputs the data generated based on the debug data by:
    storing the debug data in the debug data buffer; and
    reading, by the external mechanism, data from the debug data buffer via the interface, wherein the interface provides external access by the external mechanism to only the debug data buffer on the processor chip and does not permit the external mechanism to access other internal logic of the processor chip.

19. The processor chip of claim 11, further comprising a trigger register, wherein the health monitoring logic detects the triggering condition of the processor chip by polling a value of the trigger register to determine if the trigger register has a value written to the trigger register indicative of a failure in one of a processor core or critical logic of the processor chip.

20. A computer program product comprising a computer readable storage medium having a computer readable program stored therein, wherein the computer readable program, when executed on a hardware of a processor chip, causes the hardware to:
- place the processor chip into a secure mode of operation in which access to internal logic of the processor chip to control the internal logic of the processor chip, by mechanisms external to the processor chip, is disabled on an interface of the processor chip;
- detect a triggering condition of the processor chip that is a trigger for initiating debug data collection from the on-chip logic;
- perform debug data collection from the on-chip logic to generate debug data; and
- output, to an external mechanism via the interface, data generated based on the debug data.

21. An apparatus, comprising:
- a processor chip comprising one or more processor cores; and
- a memory coupled to the one or more processor cores of the processor chip, wherein the processor chip comprises:
- interface logic that provides a communication pathway between internal logic of the processor chip and an external mechanism;
- hardware logic that places the processor chip into a secure mode of operation in which access to internal logic of the processor chip to control the internal logic of the processor chip, by the external mechanism to the processor chip, is disabled on an interface of the processor chip;
- health monitoring logic that detects a triggering condition of the processor chip that is a trigger for initiating debug data collection from on-chip logic while the processor chip is in the secure mode of operation; and
- debug data collection engine that collects debug data from the on-chip logic to generate debug data while the processor chip is in the secure mode of operation, wherein the debug data collection engine generates data based on the debug data and the data is output to an external mechanism via the interface while the processor chip is in the secure mode of operation.

\* \* \* \* \*